United States Patent [19]

Shiki

[11] Patent Number: 4,725,023
[45] Date of Patent: Feb. 16, 1988

[54] SHADING DEVICE FOR USE IN A GEOSTATIC SATELLITE

[75] Inventor: Haruo Shiki, Tokyo, Japan

[73] Assignee: NEC Corporation, Japan

[21] Appl. No.: 631,644

[22] Filed: Jul. 17, 1984

[30] Foreign Application Priority Data

Jul. 18, 1983 [JP] Japan .................. 58-130680

[51] Int. Cl.⁴ .............................. B64G 1/58
[52] U.S. Cl. .................. 244/158 A; 244/173
[58] Field of Search .......... 244/158 R, 158 A, 163, 244/173, 164, 121, 117 A

[56] References Cited

U.S. PATENT DOCUMENTS

| | | | |
|---|---|---|---|
| 3,603,530 | 9/1971 | Easton | 244/163 |
| 3,653,942 | 4/1972 | Boebel et al. | 244/163 |
| 3,877,662 | 4/1975 | Reiter et al. | 244/164 |
| 4,508,297 | 4/1985 | Mouilhayrat et al. | 244/173 |

FOREIGN PATENT DOCUMENTS 2476018  8/1981  France .................. 244/173

OTHER PUBLICATIONS

NASA TR-32-955, "Mariner Mars 1964 Temperature Control Hardware Design and Development", W. Carroll et al., Jun. 1967.

Primary Examiner—Joseph F. Peters, Jr.
Assistant Examiner—Rodney Corl
Attorney, Agent, or Firm—Ostrolenk, Faber, Gerb & Soffen

[57] ABSTRACT

A geostatic satellite comprises a spinning drum for stabilization which spins around an axis of rotation which is parallel to the axis of the earth. A paddle member loaded with solar cells is directly rotatable about the same axis and is controlled such that the solar cells face the sun. A despun platform supports communication gear and maintains the gear pointed to a relatively fixed point on earth. A shading device for shading the electronics laden despun platform from the sun, is attached to the paddle member and rotatable therewith. Thereby, the shading device will always be disposed between the sun and the despun platform.

4 Claims, 3 Drawing Figures

SHADING DEVICE FOR USE IN A GEOSTATIC SATELLITE

BACKGROUND OF THE INVENTION

This invention relates to a shading device for a geostatic satellite.

A geostatic or geostationary satellite is usually used as a communication or a broadcasting satellite and classified as either a body stabilized type or a spin stabilized type satellite. The spin stabilized geostatic satellite comprises a spinning drum and a despun platform. This invention relates to a spin stabilized geostatic satellite which further comprises a paddle member for supporting a plurality of solar cells. The despun platform carries at least one antenna and it is kept substantially stationary relative to the axis of the earth. Inevitably, therefore, part of the despun platform is heated to a high temperature by the sun during the daytime. The temperature of the space in which the geostatic satellite revolves around the earth in synchronism with the rotation of the earth, is about 10° K. A severe temperature distribution therefore develops on the surface of the despun platform which results in a harmful temperature distribution inside the despun platform.

Various electric circuits are mounted inside the despun platform. It is important that the electrical circuits be kept in a moderate temperature range to allow them to operate properly. Therefore, it is necessary to control the temperature distribution as uniformly as possible.

SUMMARY OF THE INVENTION

It is therefore an object of the present invention to provide a shading device which is capable of shading a despun platform of a geostatic satellite from the sun.

It is another object of this invention to provide a shading device through which the temperature distribution is readily controlled in the despun platform.

A shading device according to this invention is provided for use in combination with a geostatic satellite having an axis of rotation and comprising a spinning drum rotated around an axis of rotation which is parallel to the axis of the earth, a despun platform which is held substantially stationary relative to the axis of the earth by counter rotation relative to the spinning drum, and a paddle member loaded with solar cells and rotated around the axis of rotation to direct the solar cells towards the sun. The shading device comprises a shading plate for shading a part of the despun platform from the sunbeam and rotating means for rotating the shading plate around the axis of rotation in synchronism with the paddle member.

DESCRIPTION OF THE PREFERRED EMBODIMENTS

Figure 1:
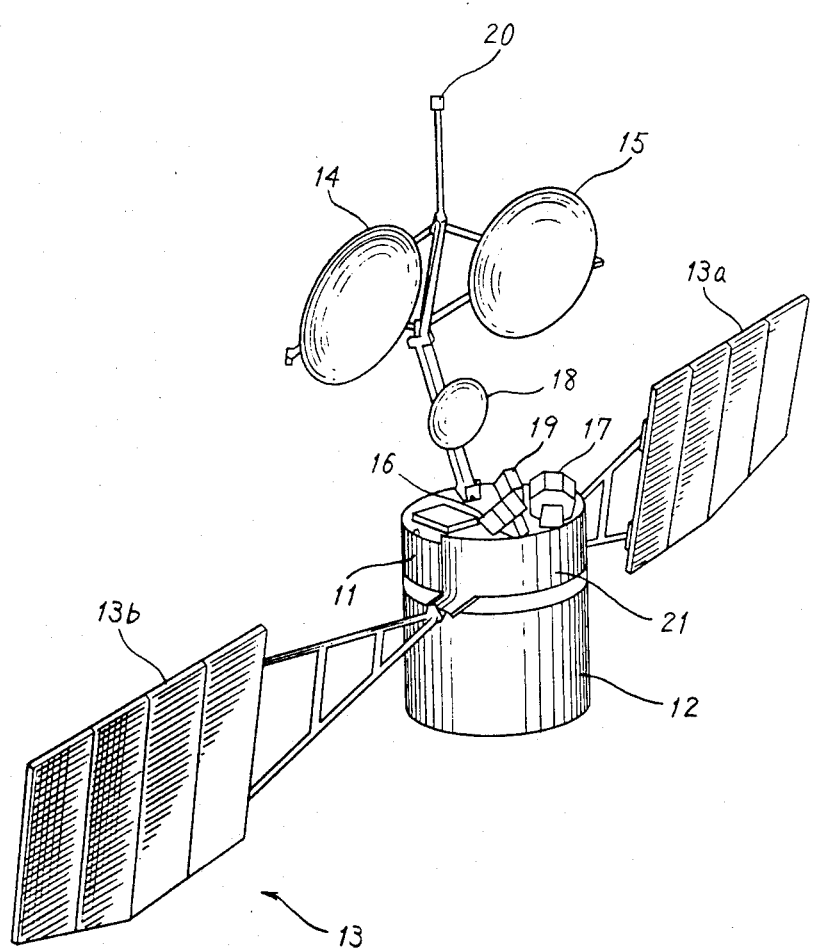
FIG. 1 shows a perspective view of a geostatic satellite which comprises a shading device according to an embodiment of this invention.

Referring to FIG. 1, a geostatic satellite will be described first in order to facilitate an understanding of the present invention. The satellite is a triple-spin stabilized satellite, having a structure whose details which will become clear later herein. The illustrated satellite has a despun platform 11, a spinning drum 12, and a paddle member 13. Both the spinning drum 12 and the despun platform 11 are cylindrical. The paddle member 13 comprises a pair of solar cell paddles 13a and 13b which extend on both sides of the despun platform 11.

The despun platform 11 provides a first surface of the satellite located at the top side thereof. The first surface faces north. The despun platform 11 also carries a pair of large parabolic reflectors 14 and 15 and a pair of primary horns 16 and 17 in one-to-one correspondence to the parabolic reflectors 14 and 15. A small parabolic reflector 18 is also carried on the despun platform 11 so as to be operable in cooperation with another primary horn 19. An omnidirectional antenna 20 extends between the large parabolic reflectors 14 and 15. The spinning drum 12 provides a second surface of the satellite opposite to the first surface and directed downwards of this figure. The second surface is directed to the south. An apogee-motor nozzle (not shown) is attached to the second surface.

The solar cell paddles 13a and 13b support a great number of solar cells for supplying electric power to elements of the satellite which will be made clearer. At any rate, no superfluous space is available by way of examples on the first and the second surfaces and, therefore, no additional external element can be mounted on the first and the second surfaces. The paddle member 13 projects from an intermediate portion located between the despun platform 11 and the spinning drum 12, as shown in FIG. 1. It is coupled to the despun platform 11 through a rotating device (not shown in FIG. 1).

Solar cells may be attached to a despun platform when a satellite consumes only a small amount of electric power. However, the solar cell paddles 13a and 13b are indispensable to a satellite, such as a broadcasting satellite, a communication satellite, or the like, which consumes a large amount of electric power. Use of the solar cell paddles 13a and 13b makes it difficult to attach the solar cells to the despun platform, as suggested by FIG. 1.

Figure 2:
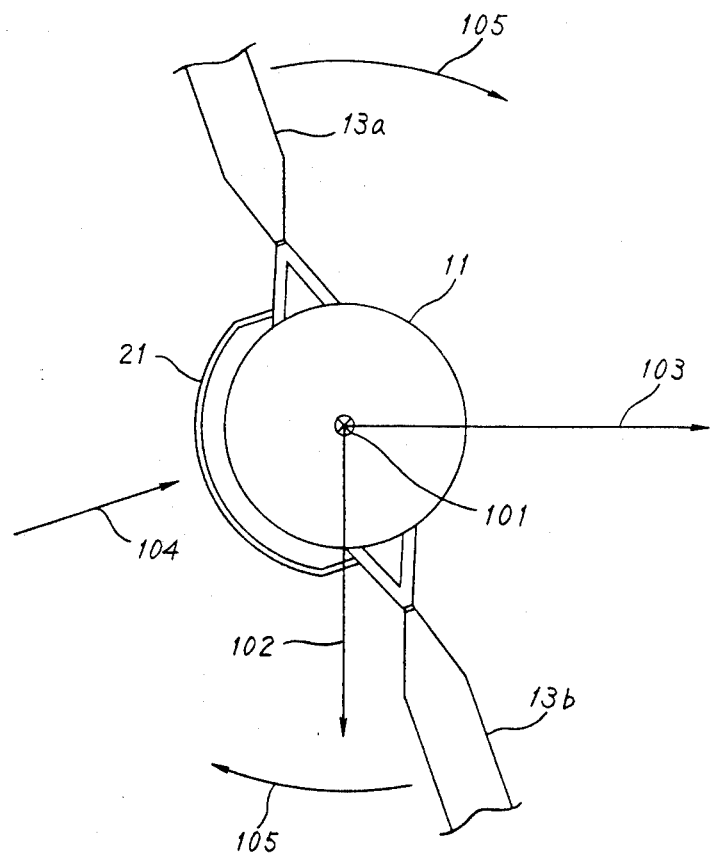
FIG. 2 shows a top view of the geostatic satellite.

Referring to FIG. 2 in conjunction with FIG. 1, the satellite is shown to have a pitch or spin axis 101 extended between the first and the second surfaces, a roll axis 102 orthogonal to the spin axis 101, and a yaw axis 103 orthogonal to both of the spin and the roll axes 101 and 102. The satellite is stabilized with respect to the three axes 101 to 103. The pitch axis 101 will presently be described in greater detail. The roll axis 102 is defined by the geostationary orbit of the satellite. The yaw axis 103 is an axis along which the satellite moves nearer to and farther from the earth. An arrow 104 shows the direction of the sun rays.

The spinning drum 12 is rotated around the pitch axis 101. The pitch axis 101 therefore serves as an axis of rotation and is stabilized so as to be parallel to the axis of the earth when the satellite is placed in the geostationary orbit. The attitude of the satellite is stably held relative to the earth by spinning the spinning drum 12.

The despun platform 11 is held substantially stationary relative to the axis of the earth by counter rotation relative to the spinning drum 12. Therefore, the despun platform 11 makes one rotation a day relative to the sun. As a result, electromagnetic beams which are radiated from the parabolic reflectors 14 and 15 and the parabolic relflector 18 are always directed towards a predetermined point on earth. The direction of the electromagnetic beams is towards a desired position on the earth.

The solar cell paddles 13a and 13b are synchronously rotated around the pitch axis 101. The solar cell paddles 13a and 13b are rotated around the pitch axis 101 in the direction of an arrow 105. As a result, the surfaces of the solar cells are directed to the sun rays 104.

In accordance with the above description, the despun platform 11 is always exposed to the sun rays 104 in the daytime. Therefore, the temperature distribution of the despun platform 11 becomes very uneven. On the other hand, the spinning drum 12 has a uniform temperature distribution because of spinning of the spinning drum 12 itself.

As shown in FIGS. 1 and 2, a shading device according to this invention is used in combination with the geostatic satellite. The shading device comprises a shading plate 21 and a rotating device therefor. The shading plate 21 comprises at least one member constructed of a material having a high reflecting factor or coefficient. The shading plate 21 is not smaller in its outer surface area than a half of the despun platform 11. For example, a surface of the shading plate 21 may be semi-cylindrical in shape. One end of the shading plate 21 is attached to one of the solar cell paddles 13a and 13b. The other end of the shading plate 21 is fixed to the other of the solar cell paddles 13a and 13b. Therefore, the shading plate 21 is rotated in synchronism with the rotation of the solar cell paddles 13a and 13b. As the solar cell paddles 13a and 13b are rotated so as to direct the surface of solar cells to the sunbeam 104, the shading plate 21 always shades the sunbeam 104 incident on the surface of the despun platform 11. Therefore, the shading plate 21 is coupled to the solar cell paddles 13a and 13b through connections therebetween. The connections are operable to rotate the shading plate 21 and may therefore be called the rotating device. This shows that the solar cell paddles 13a and 13b are coupled together with the shading plate 21 to the despun platform 11 through the connections, namely, the rotating device.

Figure 3:
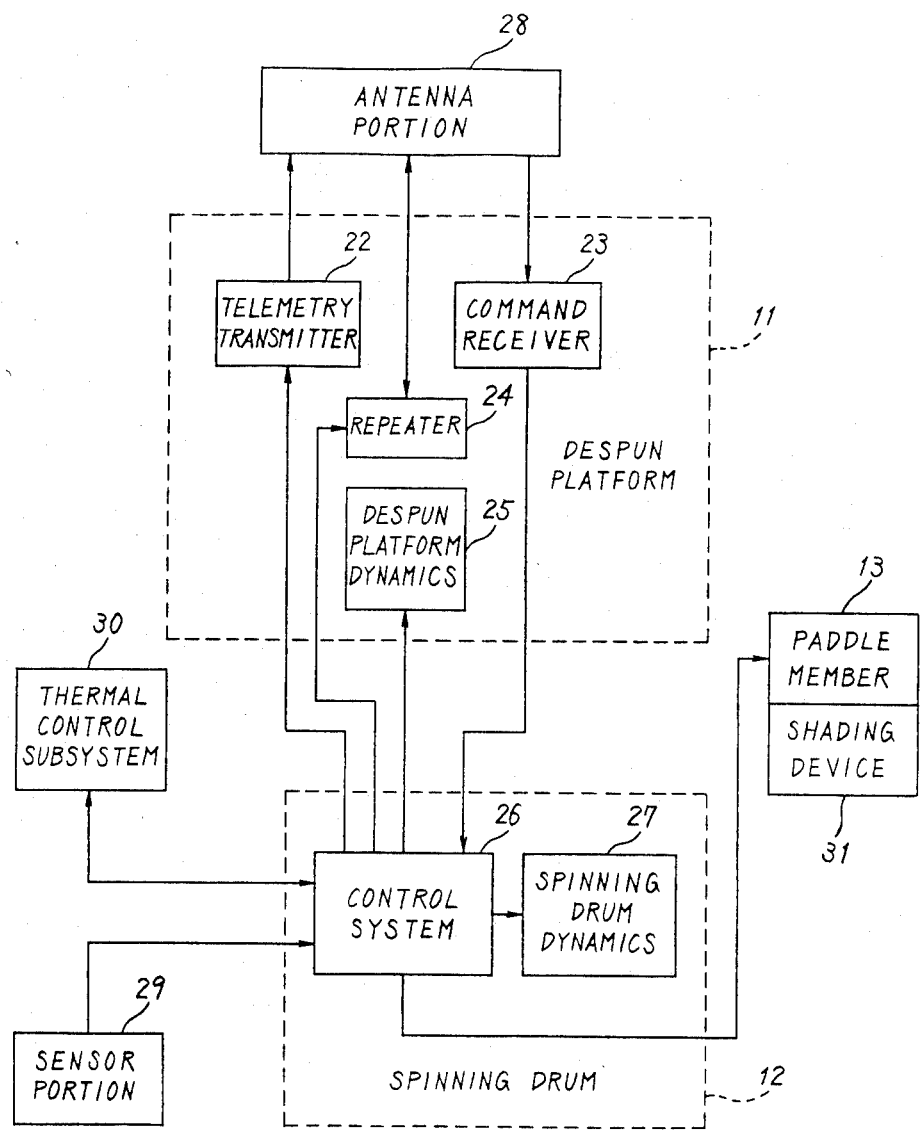
FIG. 3 schematically shows the geostatic satellite together with electrical circuits and mechanical parts mounted on the satellite.

A communication satellite will be briefly described with reference to FIG. 3. The despun platform 11 comprises a telemetry transmitter 22, a command receiver 23, a repeater 24 in the manner known in the art. A despun platform dynamics 25 is provided for counterrotating the despun platform 11 relative to the spinning drum 12. To this end, the despun platform dynamics 25 comprises a despun motor. The spinning drum 12 comprises a control system 26 which will be described later in greater detail. A spinning drum dynamics 27 is provided for rotating the spinning drum 12. The telemetry transmitter 22, the compound receiver 23, and the repeater 24 communicate with the earth in the usual manner through an antenna 28 comprising a combination of antennas as illustrated in FIG. 1. The control system 26 is connected with the telemetry transmitter 22, the command receiver 23, the repeater 24, and the despun platform dynamics 25 to control them in the usual manner. The control system 26 is connected to a sensor 29 described later. The control system 26 also controls a thermal control subsystem 30, the spinning drum dynamics 27, and the paddle member 13.

The thermal control subsystem 30 comprises a part operable for the despun platform 11 and another part for the spinning drum 12. In any event, the thermal control subsystem 30 lends itself to control the despun platform 11 and the spinning drum 12. Although not depicted in detail, each part of the thermal control subsystem 30 consists of passive members and active members. The passive members may include, for example, a member or members which incorporate high reflection factor material or an insulating material which are coated on the surfaces of the despun platform 11 and of the spinning drum 12. The active member may be, for example, electrical heaters, heat pipes, and so on as known in the art. The active member is controlled by the control system 26. The sensor portion 29 comprises sensors for observing positions of the celestial bodies, such as the sun and the earth.

The satellite operates as described below.

Communication signals are received from terrestrial stations at the antenna 28 from where they are supplied to the repeater 24 and from which they are sent back to the terrestrial stations through the antenna 28 after being first amplified. Additionally, commands are received from the terrestrial stations at the command receiver 23 through the antenna portion 28 to be sent to the control system 26. Responsive to the commands, the control system 26 controls the attitude of the satellite by driving the despun platform dynamics 25 and the spinning drum dynamics 27. The temperature of the satellite is monitored by the control system 26. The control system 26 produces a status signal specifying the status of the satellite. The status signal is sent from the control system 26 to the telemetry transmitter 22 to be delivered to the terrestrial stations through the antenna portion 28.

The control system 26 controls the rotation of the paddle member 13 as mentioned above. The shading device 31 shown in FIG. 3 rotates in synchronism with the rotation of the paddle member 13. The shading device 31 can shade the despun platform 11 from the sunbeam in the daytime by the use of the shading plate 21 (FIGS. 1 and 2). Therefore, the shading device 31 may be viewed as a portion of the thermal control subsystem 30.

As is therefore understood from the above description, the shading device always shades a portion of the satellite from the sun in the daytime. Therefore, the temperature distribution becomes uniform over the whole surface of the despun platform 11. In other words, the despun platform 11 is always kept in a substantial thermal equilibrium. This means that various internal elements can be housed in the despun platform 11. Therefore, the thermal control subsystem of the illustrated structure which serves such useful purpose may be readily designed into the satellite.

While this invention has thus far been described in conjunction with an embodiment thereof, if will readily be apparent to those skilled in the art to put this invention into practice in various other manners. This invention is equally applicable when the shading plate is rotatable in synchronism with a paddle member without the connection between the shading plate and the paddle member.

What is claimed is:
1. A geostatic satellite, comprising:
a spinning drum rotatable around an axis of rotation of said spinning drum;
a despun platform mounted coaxially with said spinning drum and adapted to counter rotate about said axis of rotation relative to said spinning drum and means for maintaining said despun platform in a substantially stationary position relative to the axis of the earth, said despun platform having an exterior surface;

an intermediate portion disposed between said spinning drum and said despun platform and being rotatable around said axis of rotation;

a paddle member and a plurality of solar cells disposed on said paddle member, said paddle member being connected to said intermediate portion, said satellite further including means for rotating said intermediate portion and said paddle member attached thereto about said axis of rotation and at a rate which may be different from a rate of rotation associated with said despun platform and further at a rate to maintain said solar cells facing towards the sun; and a shading plate movable relative to said exterior surface of said despun platform, said shading plate being directly connected to said paddle member so that said shading plate is movable together with said paddle member to shade at least a portion of said despun platform from the sun.

2. A geostatic satellite as claimed in claim 1, wherein said shading plate comprises a material having a high reflection coefficient.

3. A geostatic satellite as claimed in claim 1, wherein said despun platform comprises a circumferentially extending outer periphery and wherein said shading plate is coextensive with at least one half of said circumferential periphery of said despun platform.

4. A geostatic satellite having an axis of rotation, said satellite comprising:

a spinning drum which is rotatable around said axis of rotation to stabilize said satellite;

a despun platform, and means for maintaining said platform substantially stationary relative to the earth by counter-rotating said platform relative to said spinning drum and about said axis of rotation, said despun platform having an exterior surface of predetermined size which is exposable in portions to the sun;

an intermediate portion disposed between said spinning drum and said despun platform and being rotatable about said axis of rotation;

a paddle member having a pair of solar cell paddles which are symmetrically arranged about said axis of rotation and solar cells located on said solar cell paddles, said paddles extending in opposite directions generally away from said despun platform, said paddle member being connected to said intermediate portion and being rotatable about said axis of rotation at a rate to maintain said solar cells facing toward the sun;

a shading plate having a shading surface which is smaller in size than said exterior surface but large enough to shade at least said portions of said exterior surface which are exposed to the sun, said shading plate being directly coupled to said paddle member so that said shading plate is disposed between said despun platform and the sun to shade said despun platform; and means for rotating said intermediate portion and for connecting said shading plate to said paddles in a manner which assures that said shading plate is movable together with said paddle member to shade at least a portion of said despun platform from the sun, said rotating means being effective to rotate said paddles at a rate which may be different from a rotational speed associated with said despun platform.

* * * * *